Feb. 10, 1925.  1,526,138
M. GREGORICH
PHONOGRAPH SPRING OVERWINDING AUTOMATIC DISCONNECTER
Filed July 2, 1921  2 Sheets-Sheet 1
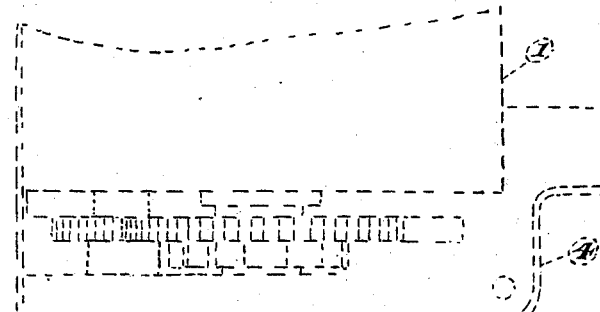
FIG. 1.
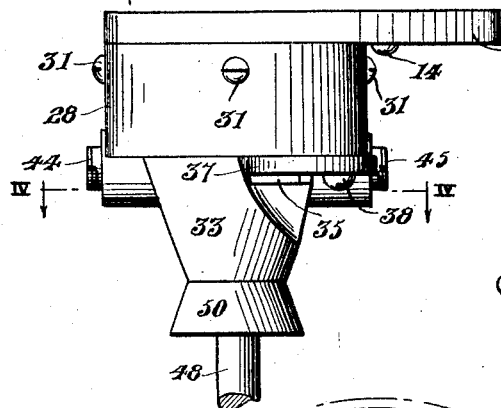
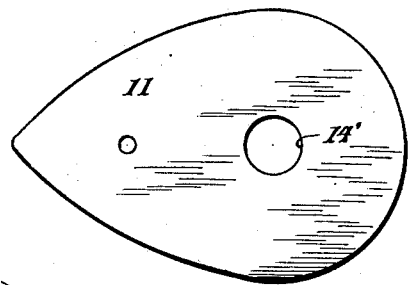
FIG. 7.
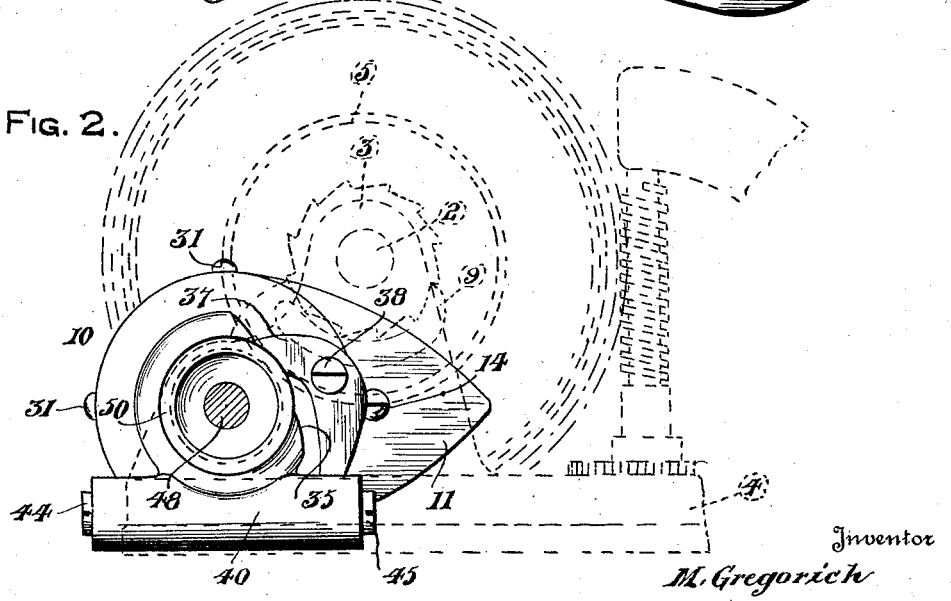
FIG. 2.
Inventor
M. Gregorich
By J. K. Bryant
Attorney

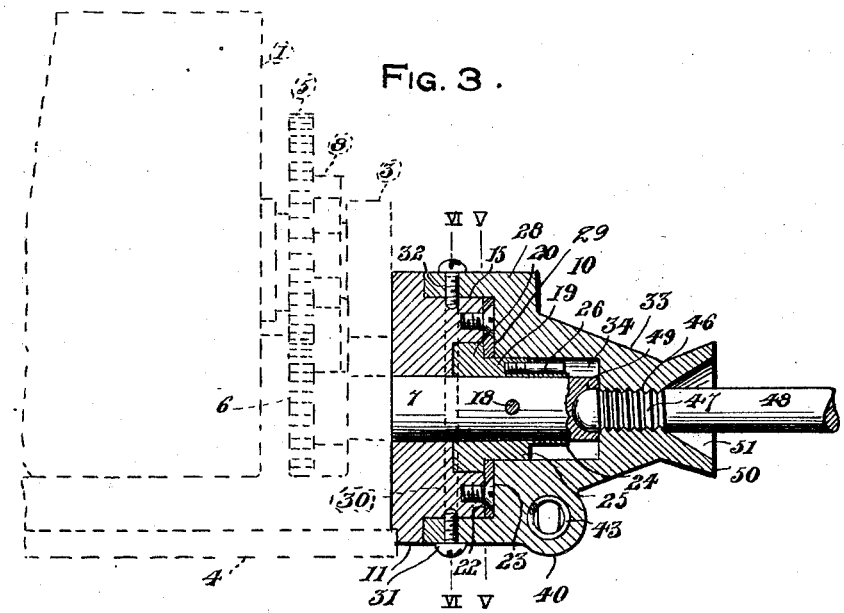
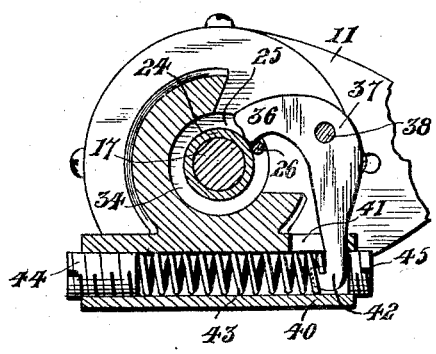
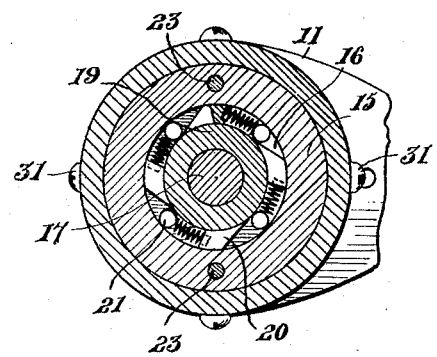

Patented Feb. 10, 1925.

1,526,138

UNITED STATES PATENT OFFICE.

MIKE GREGORICH, OF CALUMET, MICHIGAN.

PHONOGRAPH-SPRING OVERWINDING AUTOMATIC DISCONNECTER.

Application filed July 2, 1921. Serial No. 482,258.

*To all whom it may concern:*

Be it known that I, MIKE GREGORICH, a citizen of the United States of America, residing at Calumet, in the county of Houghton and State of Michigan, have invented new and useful Improvements in Phonograph-Spring Overwinding Automatic Disconnecters, of which the following is a specification.

The present invention relates to an improved device adapted for attachment to spring motors of the phonograph type for preventing over winding of the same and has for its primary object a device of this nature which may be readily attachable to substantially all forms of spring motors now employed in phonographs.

A further object of this invention is to devise such attachment for spring motors that is of a comparatively simple construction and wherein the same may be expeditiously applied to the winding shaft and supporting frame of the same by even one absolutely unskilled in the art.

A still further object of this invention is the production of a device of this character that is of such a construction, to be sold to the trade in a substantially assembled form for ready attachment to spring motors employed in phonographs.

One of the greatest disadvantages arising in spring motors now almost wholly used in all types of phonographs, and specifically those types of motors wherein the winding shafts of the same are provided with ratchet wheels for engagement with a pivoted dog member secured to the frame for preventing back-lash of the spring within the barrel, is the fact that this ratchet and dog mechanism does not effectively prevent all back-lash of the spring but allows a certain retrograde movement of the barrel, equivalent of the distance between the spaced teeth of the ratchet wheel.

With the above general objects in view and others that will appear as the nature of the invention is better understood, the same consists of the novel form, combination, and arrangement of parts hereinafter more fully described, shown in the accompanying drawings and claimed.

In the drawings wherein like reference characters designate corresponding parts throughout the several views, Fig. 1 is a top plan view of the device showing in outline a portion of the phonograph spring motor.

Fig. 2 is an end elevational view of the mechanism shown in Fig. 1,

Fig. 3 is a longitudinal sectional view thereof,

Fig. 4 is a transverse sectional view upon the line IV—IV of Fig. 1 and looking in the direction of the arrows, Figures 5 and 6 are vertical sectional views upon the lines V and VI, respectively, of Fig. 3 and looking in a direction toward the phonograph spring motor, and Fig. 7 is a plan view of the frame engaging side of a pear-shaped attaching plate for supporting the mechanism upon the motor frame.

Referring more in detail to the several views there is shown in outline a conventional type of spring motor comprising the usual spring barrel 1 having a central shaft 2 extending therethrough and journaled at its ends within vertical brackets 3 formed upon the supporting base frame 4. One end of this shaft carries the usual relatively large spur gear 5 for mesh with a smaller spur gear 6 keyed to the winding shaft 7 which gear 6 and shaft 7 are suitably journaled within the frame 4 of the motor. Adjacent one side of the relatively large spur gear 5 and keyed to the shaft 2 is the usual ratchet wheel 8 for cooperation with the pivoted dog 9 for preventing unwinding of the spring within the barrel 1.

My improved device is designated in its entirety by the numeral 10, and comprises a substantially pear-shaped attaching plate member 11 for securely retaining the completed device upon the frame of the spring motor. This plate 11 is provided with a locking set screw 14 passing through alined openings in the plate 11 and the bracket 3. This plate is further provided with a central enlarged opening 14' for positioning the plate member upon the projecting end of the winding shaft 7. Upon the opposite face of this plate 11 there is an annular-shaped enlarged portion 15 which has a centrally disposed annular-shaped channel 16 therein for purposes hereinafter more fully described.

The outer end of the winding shaft 7 has secured thereon, by a locking pin 18, a sleeve section 19 of a relatively shorter length than the outer end portion of the said winding shaft. Formed upon the inner end of this sleeve section 19 and adapted for positioning within the annular recessed portion 16, of the annular enlargement 15, upon the plate 11, are a plurality of equidistantly spaced projecting lug members 20. The opposite side walls of these lug members 20 are upon an incline and are adapted to have positioned therebetween spring pressed wedging rollers or balls 21 for allowing free movement of the sleeve 19 and its associate parts, in respect to the plate 11, in one direction, but preventing any movement thereof in an opposite direction. For preventing displacement of the wedge balls or rollers 21 and their complementary springs there is provided a centrally open annular-shaped retaining plate 22 rigidly secured to the adjacent edge of the annular enlargement 15 of the plate 11 by set screws or the like 23. The outer end of the sleeve 19 is reduced as at 24 defining an annular shoulder 25 upon the said sleeve which annular shoulder has at a convenient point thereon a screw threaded bore for receiving the screw threaded end of a longitudinally extending pin 26, functioning as hereinafter described.

Rotatably positioned upon the annular enlargement 15 of the plate 11 is an annular-shaped sleeve member 28 having a centrally apertured inner wall 29 suitably spaced from the outer edges of the sleeve member 28 and closely contacting with the adjacent face of the retaining plate 22. The enlargement 15 of the plate 11 is annularly grooved as at 30 for receiving the inner ends of retaining screws 31 which screws are screw threadedly received within equidistantly spaced screw threaded apertures 32 in the sleeve member 28, for allowing free rotary movement of this sleeve member upon the annular enlargement but preventing displacement of the same therefrom.

Integrally formed upon the opposite end of the sleeve member 28 and extending longitudinally therefrom is a conical-shaped extension 33 which has a central longitudinally extending bore 34 therein, which bore is a continuation of the central aperture within the inner spaced wall 29 of the sleeve member 28, and is adapted to receive therein the longitudinally extending sleeve member 19 pinned to the projecting end of the shaft 7, the longitudinally extending pin member 26 carried by this sleeve 19 being slightly spaced from the adjacent inner walls of the bore 34.

The conical-shaped extension 33 of the sleeve 28 is slotted as at 35 for receiving therein the hooked end 36 of a pivoted dog member 37, which dog member is pivotally secured to the adjacent outer wall of the sleeve 28 by the fulcrum pin 38. Integrally formed upon the side walls of the sleeve member 28 and the conical-shaped extension portion 33 is a transversely extending open ended barrel member 40. The barrel 40 is suitably slotted as at 41 for receiving therein the opposite end 42 of the pivoted dog member 37. Positioned within the barrel 40 is a relatively strong compression spring 43, one end of which engages the inner projecting end of the dog member 37 for normally swinging the opposite hooked end 36 of this dog member into engagement with the longitudinally projecting pin 26 of the sleeve 19. The opposite open ends of the barrel 40 are internally screw threaded for receiving therein set screws 44 and 45, the set screw 44 functioning as a means for adjusting the tension of the spring 43 and the opposite set screw 45 merely serving as a closure for the opposite end of the barrel 40.

Alined with the bore 34 of the conical extension 33 formed upon the sleeve member 28 is a relatively smaller screw threaded bore 46 for receiving the screw threaded end 47 of the winding crank 48, it being noted that the extreme outer end of this crank is so shaped as to be snugly received within the cup-shaped end 49 of the projecting portion of the shaft 7.

The outer end of the conical extension 33 of the sleeve 28 is outwardly flared as at 50 and has a central similarly flared opening 51 therein alining with the screw threaded bore 46, functioning as a guiding means for the screw threaded end of the crank shaft 48.

From the above description it will be clearly seen that any rotary movement imparted to the crank shaft 48 will impart a similar rotary movement to the sleeve member 28 positioned upon the enlargement 15 of the plate 11. The spring pressed dog member 37 being so positioned upon the sleeve 28 as to rotate therewith and in view of the compression spring 43 the inner hooked end 36 of this dog member is normally positioned within the slot 35 of the conical-shaped extension 33 at which position the hooked end of this dog member will engage with the longitudinally extending pin 26 on the shaft sleeve 19 for causing similar rotary movement of the winding shaft 7. It will therefore be seen when the different elements are in the position shown in Fig. 4, a direct drive will be imparted through the crank shaft 48 to the winding shaft 7 for winding the motor spring within the barrel 1. Should, however, the motor spring within the barrel be wound to a sufficient degree as to overcome the tension of the coil spring 43 within barrel 40 contacting with the extension end 42 of the dog member 37, the tension of the motor spring will be such as to allow the hooked end 36 of the dog to override the longitudinally projecting pin 26. The coil compression spring 43 may be so adjusted by the adjusting screw 44 as to permit the device to operate when the main motor spring has been wound to any desired degree of tension.

As hereinbefore set forth, my device is also adapted as to prevent unwinding of the main spring; the means for accomplishing this result is clearly set forth in the several views and more particularly in Fig. 5. The operation and advantages of this latter mentioned feature are fully disclosed in the accompanying specification and drawings and will be readily apparent to those skilled in the art.

While the form of the invention herein shown and described is what is believed to be the preferred embodiment thereof, it is nevertheless to be understood that various forms, modifications and arrangement of parts may be made without departing from the spirit and scope of the invention as claimed.

What is claimed as new is:—

1. An over-winding preventer for spring motors of the type described, comprising a winding shaft suitably secured within a supporting frame for the spring barrel of the motor, an attaching plate rigidly secured to the spring barrel supporting frame and loosely encircling the winding shaft, a sleeve portion fixed on the winding shaft, a pin carried by the sleeve portion, a sleeve member rotatably secured to the attaching plate, an extension formed on said sleeve member, said sleeve member and extension encircling the sleeve portion, a resilient means carried by the sleeve member and extension adapted to normally engage the pin for operatively connecting the winding shaft and sleeve member, said resilient means being displaceable when the spring of the motor has reached its proper degree of tension, and a crank shaft removably connected to the sleeve member extension for normally imparting rotary movement to the winding shaft.

2. An over-winding preventer for spring motors of the type described, comprising a winding shaft suitably secured in a supporting frame for the spring barrel of the motor, an attaching plate having an annular enlargement rigidly secured to the spring barrel supporting frame and loosely encircling the winding shaft, a sleeve portion fixed on the winding shaft outwardly of the attaching plate, a longitudinally extending pin carried by the sleeve portion, a sleeve member rotatably secured to the annular enlargement of the attaching plate, an extension formed on said sleeve member, said sleeve member with its extension encircling the sleeve portion, a resilient means carried by the sleeve member and extension adapted to normally engage the longitudinally extending pin for operatively connecting the winding shaft and sleeve member, said resilient means being displaceable when the spring of the motor has reached its proper degree of tension, and a crank shaft removably connected to the sleeve member extension for normally imparting rotary movement to the winding shaft.

3. An over-winding preventer for spring motors of the type described, comprising a winding shaft suitably secured within a supporting frame for the spring barrel of the motor, an attaching plate having an annular enlargement projecting laterally therefrom rigidly secured to the spring barrel supporting frame and loosely encircling the winding shaft, a sleeve portion fixed on the winding shaft projecting within the bore of the annular enlargement, means associated with the sleeve portion and annular enlargement for preventing back lash of the motor spring, a longitudinally extending pin carried by the sleeve portion, a sleeve member rotatably secured to the annular enlargement of the attaching plate, an extension formed on said sleeve member, said sleeve member with its extension encircling the sleeve portion, a resilient means carried by the sleeve member and extension adapted to normally engage the longitudinally extending pin for operatively connecting the winding shaft and sleeve member, said resilient means being displaceable when the spring of the motor has reached its proper degree of tension, and a crank shaft removably connected to the sleeve member extension for normally imparting rotary movement to the winding shaft.

4. An over-winding preventer for spring motors of the class described, comprising a winding shaft suitably secured within a supporting frame for the spring barrel of the motor, an attaching plate having an annular enlargement rigidly secured to the spring barrel supporting frame and loosely encircling the winding shaft, a sleeve portion fixed on the winding shaft outwardly of the attaching plate, a longitudinally extending pin carried by the sleeve portion, a sleeve member rotatably secured to the annular enlargement of the attaching plate, an extension formed on said sleeve member, said sleeve member with its extension encircling the sleeve portion, a transversely extending barrel member having a longitudinally extending slot formed in the sleeve member, said sleeve member having a slot, a pivotally mounted dog carried by the sleeve member having its opposite ends projecting through said slots with the end projecting through the last mentioned slot normally engaging said pin, a spring member within said barrel member engaging the other end of said dog for permitting the latter to be disengaged from said pin when the spring of the motor has reached its proper degree of tension, and a crank shaft removably connected to the sleeve member extension for normally imparting rotary motion to the winding shaft.

In testimony whereof I have hereunto set my hand, in the presence of two witnesses, at Calumet, Michigan, this 15th day of June, A. D. 1921.

MIKE GREGORICH.

In presence of—
CHAS. H. WEIDELMAN,
JOSEPH PLAUTZ.